UNITED STATES PATENT OFFICE.

ARTHUR LÜTTRINGHAUS, OF MANNHEIM, GERMANY, ASSIGNOR TO BADISCHE ANILIN & SODA FABRIK, OF LUDWIGSHAFEN-ON-THE-RHINE, GERMANY, A CORPORATION.

VAT DYES AND PROCESS OF MAKING THEM.

1,196,127. Specification of Letters Patent. Patented Aug. 29, 1916.

No Drawing. Application filed October 20, 1913. Serial No. 796,124.

*To all whom it may concern:*

Be it known that I, ARTHUR LÜTTRINGHAUS, citizen of the German Empire, residing at Mannheim, Germany, have invented new and useful Improvements in Vat Dyes and Processes of Making Them, of which the following is a specification.

In the *Berichte der Deutschen Chemischen Gesellschaft*, 44, page 1252, are described the production of carbazol diphthaloylic acid, by condensing carbazol with phthalic anhydrid in the presence of aluminium chlorid, and the conversion of this carbazol diphthaloylic acid, by heating with concentrated sulfuric acid, into a diphthaloyl-carbazol which dissolves in alkaline hydrosulfite solution and can be made to color cotton from this solution. Further, the specification of Patent No. 1,055,287 describes the production of bright yellow vat dyes by condensing an N-substituted carbazol with phthalic acid and heating the product thus obtained with concentrated sulfuric acid.

I have now found that carbazol compounds, under which term are included both carbazol itself and also derivatives thereof which are substituted at the nitrogen atom or in the benzene ring, on treatment, in the presence of sulfuric acid, with a phthalic-anhydrid, under which term are included both phthalic anhydrid and also halogen derivatives thereof, give rise to dyestuffs which differ from those described in the aforesaid literature and patent, and are probably isomeric with them. My new dyes have either the characteristics of vat dyes or, owing to the presence of sulfo groups, of wool dyes. The latter can under certain conditions, for instance by removing the sulfo group, be converted into vat dyes or also vice versa wool dyes can be produced by sulfonating the non-sulfonated condensation products. The formation of the condensation products is probably due to one or two phthalic acid residues entering into the carbazol molecule forming derivatives of anthraquinone.

The compounds which it is sought to protect by this application possess the following characteristics. They consist, when dry, of yellow to orange powders which give from red to violet solutions in concentrated sulfuric acid and, in their sulfonated form, are soluble in hot dilute sodium carbonate solution giving yellowish solutions, and dye wool yellow shades and, in the unsulfonated form, are insoluble in water and in dilute acids and alkalis, but are soluble in alkaline hydrosulfite solution giving brown vats which dye cotton yellow to orange-yellow shades, which shades, upon treatment with ten per cent. caustic soda solution, turn dark brown and then, on washing with water, regain their original color. By this property the new dyestuffs are distinguished from the vat dyes as described in Patent No. 1,055,287 the shades of which upon treatment with ten per cent. caustic soda solution do not show change in color.

The following examples will serve to illustrate further the nature of this invention, which, however, is not restricted in any way to these examples. The parts are by weight.

Example 1: Heat 100 parts of phthalic anhydrid with 42 parts of carbazol in 400 parts of 80% sulfuric acid for about 5 to 6 hours at 150° C. Take up the reaction mixture with water, add sodium carbonate till the solution is alkaline and treat it at from 70° to 90° C. with sodium hypochlorite solution till the color of the solution and of the precipitate has become pure yellow. The sodium salt of the sulfonic acid dyestuff produced can be almost completely separated out by adding common salt. Filter off the salt, digest it with dilute hydrochloric acid and dry after having filtered. The body produced is a yellow powder which is fairly difficultly soluble in water and easily soluble in hot strongly diluted carbonate of soda solution with an intense golden yellow color. With concentrated sulfuric acid it gives a red-violet solution. The dyestuff dyes wool from an acid bath golden yellow shades which have a good fastness to washing. In place of carbazol, N-methyl-carbazol can also, for instance, be used, in which case likewise a wool dye with a yellow shade is produced.

Example 2: Heat together for about 12 hours, at 180° C., 100 parts of phthalic anhydrid and 42 parts of carbazol with 400 parts of 90% sulfuric acid. Take up the pasty mass with water, then add sodium carbonate till the whole is alkaline, boil up and filter off the residue while hot. Extract this several times with boiling water in order to remove any soluble constituents and finally treat it at from 70° to 90° C. with sodium hypochlorite solution till the color of the precipitate, which is at first dark brown, has become yellow. Then filter off the reaction product and wash it well with hot water. It is extremely difficultly soluble in the usual solvents, giving a yellow colored solution. It crystallizes from quinolin in small golden yellow needles which dissolve in concentrated sulfuric acid with an intense carmine red color. Analysis shows that two phthalic acid residues have entered the carbazol molecule, so that the product is probably a diphthaloyl-carbazol. With alkaline hydrosulfite solution it gives a brown vat from which cotton is dyed golden yellow shades, which are fast to chlorin, washing and light, but which, on treatment with ten per cent. caustic soda solution, turn dark brown and, on washing with water, regain their original color. The same coloring matter is obtained when the carbazol in this example is replaced by an equivalent quantity of carbazol disulfonic acid.

3-chlor-carbazol, when treated according to the foregoing example, gives rise to a red tinged yellow dye.

Example 3: Heat 90 parts of phthalic anhydrid and 27 parts of 1-methyl-carbazol (*Annalen* 332, 86) with 360 parts of eighty-five per cent. sulfuric acid for from 12 to 14 hours at from 190° to 195° C. Place the reaction mixture in water, filter off the brown-black precipitate and boil up with dilute caustic soda. Then treat the residue with sodium hypochlorite solution at from 80° to 90° C. till the precipitate has assumed a red tinged yellow color. After filtering, wash the product with hot water. It can be used in this condition for dyeing. The coloring matter has properties similar to those of the product prepared from phthalic anhydrid and carbazol. It is fairly easily soluble in quinolin with a yellow color and dyes cotton from the greenish brown hydrosulfite vat fast yellow shades.

In the above examples, the concentration of the sulfuric acid can be varied within wide limits and also instead of phthalic anhydrid derivatives thereof can be used. Thus a dyestuff is obtained from carbazol and beta-chlorphthalic anhydrid which dyes cotton, from a vat, fast red-tinged yellow shades.

Now what I claim is:—

1. The process of producing coloring matters of the anthraquinone series by treating a carbazol compound with a phthalic anhydrid in the presence of sulfuric acid.

2. The process of producing a coloring matter of the anthraquinone series by heating carbazol with phthalic anhydrid in the presence of sulfuric acid.

3. The new coloring matters of the anthraquinone series being probably diphthaloyl-carbazols which can be obtained by treating a carbazol compound with a phthalic anhydrid in the presence of sulfuric acid, which coloring matters consist when dry of yellow to orange powders which give from red to violet solutions in concentrated sulfuric acid and in their sulfonated form are soluble in hot dilute sodium carbonate solution giving yellowish solutions, and dye wool yellow shades, and in the unsulfonated form are insoluble in water and in dilute acids and alkalis, but are soluble in alkaline hydrosulfite solution giving brown vats which dye cotton yellow to orange-yellow shades, which shades upon treatment with ten per cent. caustic soda solution turn dark brown, but on washing again with water regain their original color.

4. The new coloring matter of the antraquinone series being probably diphthaloyl-carbazols which can be obtained by heating carbazol with phthalic anhydrid in the presence of concentrated sulfuric acid, which coloring matter consists when dry of a yellow powder which is insoluble in water, but is soluble in quinolin with a yellow color and in concentrated sulfuric acid with a carmine red color, and is also soluble in alkaline hydrosulfite solution giving a brown vat which dyes cotton golden yellow shades, which shades upon treatment with ten per cent. caustic soda solution turn dark brown, but on washing again with water regain their original color.

In testimony whereof I have hereunto set my hand in the presence of two subscribing witnesses.

ARTHUR LÜTTRINGHAUS.

Witnesses:
  J. ALEC. LLOYD,
  H. MORARITY.